United States Patent [19]
Hojo

[11] Patent Number: 5,939,493
[45] Date of Patent: Aug. 17, 1999

[54] PNEUMATIC TIRE

[75] Inventor: Masahiro Hojo, Tokyo, Japan

[73] Assignee: Bridgestone Corporation, Tokyo, Japan

[21] Appl. No.: 08/998,551

[22] Filed: Dec. 24, 1997

[30] Foreign Application Priority Data

Mar. 11, 1997 [JP] Japan ................................. 9-056388
May 26, 1997 [JP] Japan ................................. 9-135427

[51] Int. Cl.$^6$ ................................. C08C 19/00
[52] U.S. Cl. ..................... 525/332.6; 524/83; 524/87; 524/94; 524/95; 524/137; 524/146; 524/204; 524/210; 525/332.7; 525/349; 525/341
[58] Field of Search .................. 524/137, 146, 524/83, 87, 94, 95, 204, 210, 251; 525/332.6, 332.7, 349, 341

[56] References Cited

U.S. PATENT DOCUMENTS

| | | |
|---|---|---|
| 1,288,616 | 12/1918 | Kirkbride . |
| 3,124,556 | 3/1964 | Merrifield ............................. 260/45.7 |
| 3,400,106 | 9/1968 | Morita .................................. 260/79.5 |
| 3,426,003 | 2/1969 | Leib et al. .......................... 260/79.5 |

FOREIGN PATENT DOCUMENTS

| | | | |
|---|---|---|---|
| 2110151 | 10/1971 | France . | |
| 2816065 | 10/1978 | Germany . | |
| 54-85243 | 7/1979 | Japan ............................. C08L 21/00 |
| 6-29342 | 4/1994 | Japan ............................. C08L 21/00 |
| 1054051 | 1/1967 | United Kingdom . | |

OTHER PUBLICATIONS

Verbesserung der Reversionsbeständigkeit durch nachvernetzende Beschleunigungssysteme, *Kautschuk Und Gummi,* vol. 38, No. 8, 1985 pp. 710–720.

Chemical Abstracts, vol. 100, No. 4, Jan. 23, 1984, abstract No. 23413j.

"Flexometer Predicts Heat Generation" by Hiroshi Mouri, Bridgestone Corp. pp. 24–28.

"Antioxidants–Preventive Mechanisms" by S. Almalaika, pp. 194–223.

Studied on Cure Synergism–Part I: Effect of Bis (Diisopropyl) Thiophosphoryl Disulfide and Thiazole–Based Accelerators in the Vulcanization of NR* Swapan Kumar Mandal, Rabindra Nath Datta and Dipak Kumar Basu, Polymer Science Unit, Indian Association for the Cultivation of Science, Jadavpur, Calcutta–700 032, India.

"The Relationship Between Heat Buildup and the Chemistry of Crosslinking Systems"* Theo Kempermann, Bayer AG, Leverkusen, West Germany, pp. 390–407.

Thiophosphates—helpful int e design of nitrosamine–free accrelerator systems. by H.–J. Graf and A.H. Johansson, Rhein Chemie, pp. 30–37, 80 & 81.

*Primary Examiner*—Edward J. Cain
*Attorney, Agent, or Firm*—Sughrue, Mion, Zinn, Macpeak & Seas, PLLC

[57] ABSTRACT

A rubber composition comprising 100 parts by weight of a rubber component which comprises at least one type of rubber selected from the group consisting of natural rubber and diene synthetic rubbers, 0.1 to 10 parts by weight of at least one type of metal dithiophosphate represented by the following general formula, optionally 15 to 85 parts by weight of a reinforcing inorganic filler, and optionally a specific tertiary amine compound in an amount of 0.5 to 15% by weight of the amount of the reinforcing inorganic filler is provided.

General formula

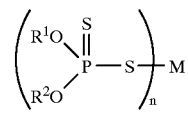

wherein $R^1$ and $R^3$ each independently represents an alkyl group or a cycloalkyl group, M represents an antimony atom, a zinc atom, a copper atom, or an iron atom, and n represents a valency of M.

The rubber composition of the present invention exhibits excellent resistance to heat or resistance to heat aging (particularly excellent resistance to hardening and excellent fracture properties).

24 Claims, No Drawings

PNEUMATIC TIRE

BACKGROUND OF THE INVENTION

1. Field of the Invention

The present invention relates to a rubber composition, and more particularly, to a rubber composition exhibiting excellent resistance to heat or resistance to heat aging (particularly excellent resistance to hardening and excellent fracture properties).

2. Description of Related Art

Together with the higher performance and higher speeds achieved by automobiles, in recent years, tires, particularly tread components, are increasingly required to have higher resistance to heat or higher resistance to heat aging and more excellent fracture properties than hitherto.

The use of tetramethylthiuramdisulfide (TMTD) and tetramethylthiurammonosulfide (TMTM) which have heretofore been used as heat resistant crosslinking agents or vulcanization accelerators is becoming increasingly difficult for various reasons. As a vulcanization accelerator to replace these compounds, zinc dithiophosphates and dithiophosphoric acid disulfides are attracting attention, and some of these compounds are practically used.

As for zinc dithiophosphates, it is described in U.S. Pat. Nos. 1,288,616 and 3,426,003 (MONSANTO Co., US, which is FLEXSYS Co., at present) how rubber compositions comprising a zinc dithiophosphate exhibit the effect of preventing vulcanization reversion. It is described in Japanese Patent Application Laid-Open No. Showa 54-85243 how a zinc dithiophosphate is effective as a component in sulfur-less crosslinking. Zinc dithiophosphates are described in many references. As typical examples of such references, an article by GRAF, H. J. and JOHANSSON, A. H. in Rubber World 212(5), 30 (1995) shows that a zinc dithiophosphate is used as an accelerator which does not form nitrosoamine, and an article by KEMPERMANN in Theo; Rubber Chem. Technol. 55(2) 391–406 (1982) shows that a zinc dithiophosphate exhibits the effect of improving heat resistance.

The above rubber compositions comprising a zinc dithiophosphate or a dithiophosphoric acid disulfide show improved heat resistance. However, the effect of the improvement is limited, and it is apparent that these rubber compositions will not be able to satisfy the higher degrees of requirement for heat resistance expected in future.

When a tetraoctylthiuramdisulfide or a teterabenzylthiuramdisulfide is used in place of a zinc dithiophosphate as a compound to replace TMTD, the heat resistance obtained remains at the same level as that obtained by using a zinc dithiophosphate and is not satisfactory.

On the other hand, antimony dithiophosphates have been known as additives to lubricating oil but have never been used in rubber compositions.

It is proposed in Japanese Patent Publication Heisei 6-29342 that a rubber composition comprising carbon black and a combination of a metal dithiophosphate, bismaleimide, and a sulfenamide shows good resistance to scorching, prevention of vulcanization reversion, resistance to heat degradation, and resistance to flex crack and degradation. In recent years, fillers, such as silica and aluminum hydroxide, have attracted attention as reinforcing fillers for rubber other than carbon black. Therefore, the present inventors tried to apply zinc dithiophosphates to rubber compositions comprising silica. However, a rubber composition having improved resistance to -heat aging to the same degree as that of rubber compositions comprising carbon black could not be obtained.

On the other hand, the present applicant has discovered that a rubber composition showing low heat buildup can be obtained in accordance with a formulation comprising silica and a specific tertiary amine (Japanese Patent Application No. Heisei 8-166052). However, resistance to heat aging is not improved when this tertiary amine is used in combination with a mercaptobenzothiazole or a benzothiazylsulfenamide which is generally used as a vulcanization accelerator for diene rubber.

SUMMARY OF THE INVENTION

The present invention has been made on the basis of the above facts. The first object of the present invention is to provide a rubber composition having resistance to heat aging which is higher than that provided by conventional technologies. The second object of the present invention is to provide a rubber composition having an improved resistance to heat aging (particularly, an improved property of suppressing hardening of rubber after heat aging, i.e., improved resistance to hardening, and improved fracture properties).

In one embodiment of the present invention, extensive studies focused on metal dithiophosphates which are used as vulcanization accelerators, resulted in the finding that the problem of insufficient heat resistance could be solved by the following means, using antimony dithiophosphates which have not heretofore been paid attention as a vulcanization accelerator.

This embodiment in which antimony dithiophosphates are used is hereinafter referred to as MA Embodiment.

Accordingly, in MA Embodiment, (1) the rubber composition of the present invention is characterized in that the rubber composition comprises:

100 parts by weight of a rubber component which comprises at least one type of rubber selected from the group consisting of natural rubber and diene synthetic rubbers; and per 100 parts by weight of the rubber component, 0.1 to 10 parts by weight of at least one type of metal dithiophosphate represented by following general formula (I):

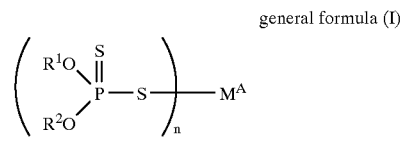

general formula (I)

wherein $R^1$ and $R^2$ each independently represents an alkyl group, an alkenyl group, or a cycloalkyl group each having 19 or fewer carbon atoms, $M^A$ represents an antimony atom, and n represents a valency of $M^A$.

(2) The rubber composition of the present invention is characterized in that, in the rubber composition described in (1), $R^1$ and $R^2$ in general formula (I) representing the metal dithiophosphate in (1) each independently represents an alkyl group or a cycloalkyl group each having 8 or fewer carbon atoms.

(3) The rubber composition of the present invention is characterized in that the rubber composition described in (2) comprises the metal dithiophosphate described in (2) and at least one compound selected from the group consisting of benzothiazole derivatives represented by following general formula (II) and thiuram compounds represented by following general formula (III):

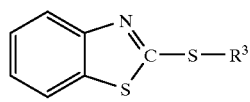

general formula (II)

wherein R³ represents a hydrogen atom, a thiobenzothiazyl group represented by following formula 1:

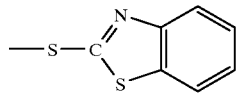

formula 1 or an amino group represented by following formula 2:

formula 2 wherein R⁴ and R⁵ each independently represents a hydrogen atom, an alkyl group having 2 to 4 carbon atoms, or a cyclohexyl group, excluding the case in which R⁴ and R⁵ both represent hydrogen atoms,

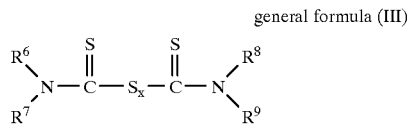

general formula (III)

wherein R⁶, R⁷, R⁸, and R⁹ each independently represents an alkyl group having 1 to 8 carbon atoms, a cyclohexyl group, a phenyl group, or a benzyl group, or a combination of R⁶ and R⁷ and a combination of R⁸ and R⁹ each represents a cyclic pentamethylene group or a cyclic methylpentamethylene group in which R⁶ and R⁷, and R⁸ and R⁹, respectively, are bonded to each other.

(4) The rubber composition of the present invention is characterized in that, in the rubber composition described in (3), R⁶ R⁷, R⁸, and R⁹ in general formula (III) representing the thiuram compound in (3) each independently represents a 2-ethylhexyl group or a benzyl group.

(5) The rubber composition of the present invention is characterized in that the rubber composition described in (1) further comprises at least one type of vulcanization accelerator selected from the group consisting of 2-benzothiazylsulfenamides and 2-benzothiazylsulfenimides.

(6) The rubber composition of the present invention is characterized in that the 100 parts by weight of the rubber component comprises 50 parts by weight or more of a styrene-butadiene copolymer.

(7) The rubber composition of the present invention is characterized in that the rubber composition described in (1) comprises 15 to 85 parts by weight of a reinforcing inorganic filler selected from silica and aluminum hydroxide per 100 parts by weight of the rubber component.

(8) The rubber composition of the present invention is characterized in that, in the rubber composition described in (7), the reinforcing inorganic filler is silica.

(9) The rubber composition of the present invention is characterized in that the rubber composition described in (7) comprises, in an amount of 1 to 15% by weight of the amount of the reinforcing inorganic filler, a tertiary amine compound represented by following general formula (IV):

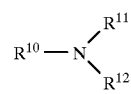

general formula (IV)

wherein $R^{10}$, $R^{11}$, and $R^{12}$ each independently represents a methyl group, an alkyl group having 8 to 36 carbon atoms, an alkenyl group having 8 to 36 carbon atoms, a cyclohexyl group, or a benzyl group.

(10) The rubber composition of the present invention is characterized in that the rubber composition described in (8) comprises a silane coupling agent in an amount of 1 to 15% by weight of the amount of silica.

(11) The rubber composition of the present invention is characterized in that the rubber composition described in (7) comprises 20 to 150 parts by weight of carbon black as a reinforcing filler per 100 parts by weight of the rubber component.

(12) The rubber composition of the present invention is characterized in that, in the rubber composition described in (1), the 100 parts by weight of the rubber component comprises 50 parts by weight or more of styrene-butadiene copolymer, and the rubber composition comprises 15 to 85 parts by weight of silica as a reinforcing inorganic filler per 100 parts by weight of the rubber component, at least one type of vulcanization accelerator selected from the group consisting of 2-benzothiazylsulfenamides and 2-benzothiazylsulfenimides, and a tertiary amine compound in an amount of 1 to 15% by weight of the amount of the reinforcing inorganic filler.

In another embodiment of the present invention, extensive studies focused on metal dithiophosphates other than antimony dithiophosphates and various types of additives in formulations comprising silica, resulted in the finding that the problem of insufficient resistance to heat aging could be solved by the following means.

This embodiment in which metal dithiophosphates other than antimony dithiophosphates are used is referred to as MB Embodiment, hereinafter.

Accordingly, in the MB Embodiment, (13) the rubber composition of the present invention is characterized in that the rubber composition comprises:

100 parts by weight of a rubber component which comprises at least one rubber selected from the group consisting of natural rubber and diene synthetic rubbers;

per 100 parts by weight of the rubber component, 15 to 85 parts by weight of a reinforcing inorganic filler;

per 100 parts by weight of the rubber component, 0.1 to 5 parts by weight of at least one type of metal dithiophosphate represented by following general formula (V):

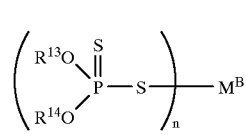

general formula (V)

wherein $R^{13}$ and $R^{14}$ each independently represents an alkyl group or a cycloalkyl group, $M^B$ represents a zinc atom, a copper atom, or an iron atom, and n represents a valency of $M^B$, and, in an amount of 0.5 to 15% by weight of the amount of the reinforcing inorganic filler, at least one type of tertiary amine compound represented by following general formula (VI):

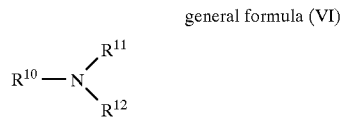
general formula (VI)

wherein $R^{10}$, $R^{11}$, and $R^{12}$ each independently represents a methyl group, an alkyl group having 8 to 36 carbon atoms, an alkenyl group having 8 to 36 carbon atoms, a cyclohexyl group, or a benzyl group.

(14) The rubber composition of the present invention is characterized in that, in the rubber composition described in (13), $R^{13}$ and $R^{14}$ in general formula (V) representing the metal dithiophosphate in (13) each independently represents an alkyl group having 2 to 8 carbon atoms, and $M^B$ represents a zinc atom.

(15) The rubber composition of the present invention is characterized in that, in the rubber composition described in (13), $R^{13}$ and $R^{14}$ in general formula (V) representing the metal dithiophosphate in (13) each independently represents an alkyl group having 3 or 4 carbon atoms.

(16) The rubber composition of the present invention is characterized in that, in the rubber composition described in (13), the metal dithiophosphate represented by general formula (V) in (13) is zinc dithiophosphate, and the rubber composition comprises at least one type of vulcanization accelerator selected from the group consisting of 2-benzothiazylsulfenamides and 2-benzothiazylsulfenimides.

(17) The rubber composition of the present invention is characterized in that, in the rubber composition described in (13), the reinforcing inorganic filler is silica or aluminum hydroxide.

(18) The rubber composition of the present invention is characterized in that, in the rubber composition described in (13), the reinforcing inorganic filler is silica.

(19) The rubber composition of the present invention is characterized in that the rubber composition described in (18) comprises a silane coupling agent in an amount of 1 to 15% by weight of the amount of silica.

(20) The rubber composition of the present invention is characterized in that the rubber composition described in (13) comprises 5 to 80 parts by weight of carbon black per 100 parts by weight of the rubber component.

(21) The rubber composition of the present invention is characterized in that, in the rubber composition described in (13), the tertiary amine compound represented by general formula (VI) in (13) has a molecular weight of 180 or more.

(22) The rubber composition of the present invention is characterized in that, in the rubber composition described in (13), both $R^{10}$ and $R^{11}$ represent methyl groups, and $R^{12}$ represents an alkyl group having 12 to 36 carbon atoms, in general formula (VI) representing the tertiary amine compound in (13).

(23) The rubber composition of the present invention is characterized in that, in the rubber composition described in (13), the tertiary amine compound is dimethylstearylamine.

(24) The rubber composition of the present invention is characterized in that, in the rubber composition described in (13), $R^{13}$ and $R^{14}$ in general formula (V) representing the metal dithiophosphate in (13) each independently represents an alkyl group having 3 or 4 carbon atoms, the tertiary amine compound is dimethylstearylamine, a silane coupling agent is comprised in an amount of 1 to 15% by weight of the amount of silica, and carbon black is comprised in an amount of 5 to 80 parts by weight per 100 parts by weight of the rubber component.

DESCRIPTION OF THE PREFERRED EMBODIMENTS

The rubber component used in the present invention is at least one type of rubber selected from the group consisting of natural rubber and diene synthetic rubbers. A single type of the rubbers or a blend of two or more types of the rubbers selected from natural rubber and many types of diene synthetic rubber may be used. Examples of the diene synthetic rubber include synthetic polyisoprene rubber (IR), polybutadiene rubber (BR), styrene-butadiene rubber (SBR), and butyl rubber (IIR).

In the present invention, for example, SBR alone, blends of SBR and NR, and blends of SBR, NR, and BR are preferably used among these rubber components in view of their effect. When a blend of two or more types of rubber is used as the rubber component in the MA Embodiment, preferably 50 parts by weight or more, more preferably 70 parts by weight or more, of SBR is comprised in 100 parts by weight of the rubber component.

The metal dithiophosphate used in the MA Embodiment of the present invention is represented by general formula (I) described above wherein $M^A$ represents an antimony atom, i.e., it is an antimony dithiophosphate. The metal dithiophosphate may be used singly or as a blend of two or more types. In the formula, $R^1$ and $R^2$ each independently represents an alkyl group, an alkenyl group, or a cycloalkyl group each having 19 or less carbon atoms, and preferably an alkyl group or a cycloalkyl group having 8 or less carbon atoms.

Examples of the antimony dithiophosphate include antimony O,O-dibutydithiophosphate, antimony O,O-diisopropyldithiophosphate, antimony O,O-dipropyldithiophosphate, antimony O,O-diethyldithiophosphate, antimony O,O-dimethyldithiophosphate, antimony O,O-bis(2-ethylhexyl)dithiophosphate, and antimony O,O-bis(4-methylpentyl)dithiophosphate. Among these compounds, antimony O,O-dibutyldithiophosphate, antimony O,O-diisopropyldithiophosphate, and antimony O,O-bis(2-ethylhexyl)dithiophosphate are preferable in view of their the effect.

It is also preferable that the antimony dithiophosphate is used in combination with a zinc dithiophosphate.

The amount of the antimony dithiophosphate used in the composition is 0.1 to 10 parts by weight, and preferably 0.2 to 3 parts by weight, per 100 parts by weight of the rubber component. When the amount is less than 0.1 part by weight, satisfactory properties cannot be obtained. When the amount exceeds 10 parts by weight, the effect is not increased, and moreover, workability becomes inferior.

The metal dithiophosphate used in the MB Embodiment of the present invention is represented by general formula (V) described above and may be used singly or as a blend of two or more types. In the formula, $R^{13}$ and $R^{14}$ each independently represents an alkyl group or a cycloalkyl group, preferably an alkyl group having 2 to 8 carbon atoms, more preferably an alkyl group having 3 or 4 carbon atoms. In the formula, $M^B$ represents a zinc atom, a copper atom, or an iron atom, preferably a zinc atom. More particularly, zinc dithiophosphates are preferable because higher resistance to heat aging is exhibited. Zinc dithiophosphates represented by general formula (V) in which $R^{13}$ and $R^{14}$ each independently represents an alkyl group having 2 to 8 carbon atoms are most preferable because higher resistance to heat aging is exhibited.

Examples of the zinc dithiophosphate include zinc O,O-dibutyldithiophosphate, zinc O,O-diisopropyldithiophosphate, zinc O,O-dipropyldithiophosphate, zinc O,O-diethyldithiophosphate, zinc O,O-dimethyldithiophosphate, zinc O,O-bis(2-ethylhexyl)dithiophosphate, zinc O,O-bis(4-methylpentyl)dithiophosphate, and zinc O,O-octadecyldithiophosphate. Among these compounds, zinc O,O-dibutyldithiophosphate, zinc O,O-diisopropyldithiophosphate, and zinc O,O-bis(2-ethylhexyl) dithiophosphate are preferable.

Examples of the copper dithiophosphate include copper O,O-octadecyldithiophosphate, copper O,O-dibutyldithiophosphate, copper O,O-diisopropyldithiophosphate, copper O,O-dipropyldithiophosphate, copper O,O-diethyldithiophosphate, copper O,O-dimethyldithiophosphate, copper O,O-bis(2-ethylhexyl)dithiophosphate, and copper O,O-bis(4-methylpentyl)dithiophosphate.

Examples of the iron dithiophosphate include iron O,O-dibutyldithiophosphate, iron O,O-diisopropyldithiophosphate, iron O,O-dipropyldithiophosphate, iron O,O-diethyldithiophosphate, iron O,O-dimethyldithiophosphate, iron O,O-bis(2-ethylhexyl)dithiophosphate, iron O,O-bis(4-methylpentyl)dithiophosphate, and iron O,O-octadecyldithiophosphate.

The amount of the metal dithiophosphate used in the MB Embodiment is 0.1 to 5 parts by weight, and preferably 0.2 to 2 parts by weight, per 100 parts by weight of the rubber component. When the amount is less than 0.1 part by weight, the effect of the metal dithiophosphate is insufficient. When the amount exceeds 5 parts by weight, the effect of the metal dithiophosphate is saturated, and moreover, the scorch time (the time before scorching) of the rubber is decreased causing inferior workability. Therefore, such amounts are not preferable.

The process for preparation of the metal dithiophosphate is not particularly limited. The metal dithiophosphate is generally prepared by slowly adding sodium hydroxide into an aqueous solution of dithiophosphoric acid to form sodium dithiophosphate in situ, then adding an acetone solution of chloride of antimony, zinc, copper, or iron dropwise to the obtained system to obtain corresponding precipitates, followed by purifying and drying the obtained precipitates to obtain the corresponding metal dithiophosphate.

In the MA Embodiment of the present invention, the antimony dithiophosphate represented by general formula (I) may be used singly. It is preferable that the antimony dithiophosphate is used in combination with at least one type of vulcanization accelerator selected from the group consisting of benzothiazole derivatives represented by general formula (II) described above, and thiuram compounds represented by general formula (III) described above, because the Mooney scorch time is increased and the same effect as that obtained by the single use of a smaller amount of the antimony dithiophosphate can be obtained.

In the MB Embodiment of the present invention, the metal dithiophosphate represented by general formula (V) may be used singly. It is preferable that the metal dithiophosphate is used in combination with at least one type of vulcanization accelerator selected from the group consisting of benzothiazole derivatives used as the vulcanization accelerator, such as 2-benzothiazylsulfenamides and 2-benzothiazylsulfenimides, because the Mooney scorch time is increased and the same effect as that obtained by the single use of the metal dithiophosphate can be obtained.

Examples of the benzothiazole derivative include 2-mercaptobenzothiazole, dibenzothiazyldisulfide, N-cyclohexyl-2-benzothiazylsulfenamide, N,N-dicyclohexyl-2-benzothiazylsulfenamide, N,N-diisopropyl-2-benzothiazylsulfenamide, N-t-butyl-2-benzothiazylsulfenamide, N-t-butyl-2-benzothiazylsulfenimide, and N-cyclohexyl-2-benzothiazylsulfenimide. Among these compounds, N-t-butyl-2-benzothiazylsulfenamide, N-cyclohexyl-2-benzothiazylsulfenamide, N-t-butyl-2-benzothiazylsulfenimide, and N-t-butyl-2-benzothiazylsulfenimide are preferable in view of the effect.

Examples of the thiuram compound include tetramethylthiuramdisulfide, tetraethylthiuramdisulfide, tetra(2-ethylhexyl)thiuramdisulfide, tetrabenzylthiuramdisulfide, and tetraisobutylthiuramdisulfide. Among these compounds, tetra(2-ethylhexyl)thiuramdisulfide, tetrabenzylthiuramdisulfide, and tetraisobutylthiuramdisulfide are preferable in view of their effect.

The reinforcing filler which can be used in the MA Embodiment of the present invention is not particularly limited. At least one type of filler selected from reinforcing inorganic fillers, such as carbon black, silica, and aluminum hydroxide, is generally used. Among these reinforcing inorganic fillers, silica is preferably used.

As the reinforcing filler which can be used in the MB embodiment of the present invention, at least one type of filler selected from reinforcing inorganic fillers, such as silica and aluminum hydroxide, is used. Among these reinforcing inorganic fillers, silica is preferable. Ordinary carbon black can be used in combination with the reinforcing inorganic filler.

The amount of silica or aluminum hydroxide is preferably 15 to 85 parts by weight per 100 parts by weight of the rubber component in both the MA Embodiment and the MB Embodiment. When the amount is less than 15 parts by weight, the reinforcing property cannot be obtained unless carbon black is present. When the amount exceeds 85 parts by weight, workability in processes such as warming up and extrusion deteriorates. Therefore, such amounts are not preferable. The amount is more preferably 20 to 65 parts by weight in view of the reinforcing properties, low heat buildup, and workability.

As carbon black, for example, SAF, ISAF, HAF, FEF, and GPF are preferably used. The amount of carbon black in the MA Embodiment is preferably 20 to 150 parts by weight per 100 parts by weight of the rubber component. When the amount is less than 20 parts by weight, the reinforcing effect of carbon black is insufficient. When the amount exceeds 150 parts by weight, workability markedly deteriorates. Therefore, such amounts are not preferable. The amount of carbon black in the MB Embodiment is preferably 5 to 80 parts by weight per 100 parts by weight of the rubber component. When the amount exceeds 80 parts by weight, low heat buildup and workability markedly deteriorate, thus the amount is not preferable. The amount is more preferably 25 to 60 parts by weight in view of the reinforcing properties and low heat buildup.

In the present invention, a silane coupling agent is preferably used when silica is used as the reinforcing filler.

Examples of the silane coupling agent include bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-nitropropyltrimethoxysilane, 3-nitropropyltriethoxysilane, 3-chloropropyltrimethoxysilane, 3-chloropropyltriethoxysilane, 2-chloroethyltrimethoxysilane, 2-chloroethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazole tetrasulfide, 3-triethoxysilylpropylbenzothiazole tetrasulfide, 3-triethoxysilylpropyl methacrylate monosulfide, 3-trimethoxysilylpropyl methacrylate monosulfide, γ-aminopropyltriethoxysilane, N-phenyl-γ-aminopropyltrimethoxysilane, and N-β-(aminoethyl)-γ-aminopropyltrimethoxysilane. Among these compounds, bis(3-triethoxysilylpropyl)tetrasulfide, 3-mercaptopropyltriethoxysilane, γ-aminopropyltriethoxysilane, N-phenyl-γ-aminopropyltrimethoxysilane, and N-β-(aminoethyl)-γ-aminopropyltrimethoxysilane are preferable.

Other examples of the silane coupling agent include bis(3-diethoxymethylsilylpropyl)tetrasulfide, 3-mercaptopropyldimethoxymethylsilane, 3-nitropropyldimethoxymethylsilane, 3-chloropropyldimethoxymethylsilane, dimethoxymethylsilylpropyl-N,N-dithiocarbamoyl tetrasulfide, and dimethoxymethylsilylpropylbenzothiazole tetrasulfide.

The amount of the silane coupling agent is preferably 1 to 15% by weight, and more preferably 5 to 12% by weight, of the amount of silica. When the amount of the silane coupling agent is less than 1% by weight, the coupling effect is small. When the amount exceeds 15% by weight, gel is formed. Therefore, such amounts are not preferable.

In the present invention, a tertiary amine compound is advantageously used when silica or aluminum hydroxide is used as the reinforcing inorganic filler.

As the tertiary amine compound used in the present invention, compounds represented by general formulae (IV) or (VI) described above are used singly or as a mixture of two or more types. In the formulae, $R^{10}$, $R^{11}$, and $R^{12}$ each independently represents a methyl group, an alkyl group having 8 to 36 carbon atoms, an alkenyl group having 8 to 36 carbon atoms, a cyclohexyl group, or a benzyl group.

Among these compounds, tertiary amine compounds in which $R^{10}$ and $R^{11}$ both represent methyl groups and $R^{12}$ represents an alkyl group having 12 to 36 carbon atoms are preferable. Particularly, dimethylstearylamine is preferable in view of the flash point, low heat buildup, and improvement in dispersion.

Examples of the tertiary amine compound include trioctylamine, trilaurylamine, dimethylstearylamine, dimethyldecylamine, dimethylmyristylamine, dilaurylmonomethylamine, dimethyloctadecenylamine, and dimethylhexadecenylamine.

The amount of the above tertiary amine compound is 0.5 to 15% by weight, preferably 2 to 10% by weight, of the amount of silica or aluminum hydroxide. When the amount is less than 0.5% by weight, the improvement in the resistance to heat aging, which is the object of the invention, is not exhibited. When the amount exceeds 15% by weight, the effect is saturated, and abrasion resistance deteriorates because the above tertiary amine compound works as a plasticizer. Therefore, such amounts are not preferable.

The molecular weight of the tertiary amine compound used in the present invention is preferably 180 or more. When the molecular weight is less than 180, the flash point becomes 100° C. or lower. This may cause fire in the process, and such a molecular weight is not preferable.

The rubber composition of the present invention may, where necessary, comprise suitable compounding ingredients generally used in the rubber industry, such as softeners, antioxidants, vulcanizing agents, and vulcanization accelerators, in addition to the above components.

The rubber composition of the present invention can be obtained by mixing the components using a mixer, such as rolls, an internal mixer, or a Banbury mixer, and advantageously used for treads and side walls of tires after forming and vulcanization. The rubber composition can also be applied to any other rubber products, such as engine mounts, conveyor belts, and hoses.

The mechanism of the present invention is described in the following.

The improvement in heat resistance in the MA Embodiment is considered to arise from the increased thermal stability of the network structure due to the use of the metal dithiophosphate. An example is shown in the following.

A vulcanizate prepared without using any metal dithiophosphate was used as a control. A vulcanizate prepared by using tetra(2-ethylhexyl)thiuramdisulfide (TOT) without using any additive of the MB Embodiment of the present invention was used as an example of the conventional vulcanizate. A vulcanizate prepared by using antimony O,O-diisopropyldithiophosphate (in the same number of moles as that of TOT) was used as an example of the vulcanizate of the present invention. The network structures of the control, the example of the conventional vulcanizate, and the example of the vulcanizate of the present invention were measured and were compared with each other for analysis. The result is shown in Table 1.

TABLE 1

|  | total amount of network | amount of polysulfide (S3 or more) network | amount of disulfide (S2) network | amount of monosulfide (S1) network |
| --- | --- | --- | --- | --- |
| control | 100 | 61 | 24 | 15 |
| conventional | 100 | 40 | 12 | 48 |
| present invention | 100 | 29 | 15 | 56 | control: No metal dithiophosphate was used.
conventional: Tetra(2-ethylhexyl)thiuramdisulfide was used.
present invention: O,O diisopropyldithiophosphate was used.

The control, the example of the conventional vulcanizate, and the example of the vulcanizate of the present invention were prepared in accordance with the formulations of Comparative Example 1, Comparative Example 4, and Example 2, respectively, and the obtained compounds were mixed and vulcanized in accordance with the same method as that used in the Examples. The measurement of the network structure was conducted in accordance with the method described in Rubber Chem. Technol., 62, 571 (1989).

As shown in Table 1, the conventional vulcanizate (in which tetra(2-ethylhexyl)thiuramdisulfide was used) is considered to show better heat resistance than that of the control because the amount of the monosulfide network was increased. The vulcanizate of the present invention (in which an antimony dithiophosphate was used) is considered to show still better heat resistance than that of the conventional vulcanizate because the amount of the monosulfide network was further increased and the amount of the disulfide network was also increased.

The mechanism of the improvement in the resistance to heat aging in the MB Embodiment is described in the following.

Metal dithiophosphates have been used as antioxidants in lubricating oil for a long time. The reaction mechanism was investigated in detail in S. AL-MALAIKA et al.

(Atmospheric Oxidation and Antioxidants, Vol I, 195 (1993), G. SCOTT, editor, ELSEVIER Co.). It is known that metal dithiophosphates have the ability to decompose peroxides.

It is confirmed in S. K. MANDEL, R. N. DATTA, D. K. BASU, et al. (Rubber Chem. Technol., 62, 569 (1989)) that dithiophosphoric acid disulfide remarkably increases the monosulfide linkage in the network structure of vulcanizates of compositions containing NR.

From such past knowledge, metal dithiophosphates are considered to provide excellent resistance to heat aging to vulcanized compositions containing carbon black as described above because metal dithiophosphates exhibit (i) an effect as antioxidants and (ii) an effect of forming the thermally stable monosulfide linkage. Metal dithiophosphates show a less remarkable effect on vulcanized compositions containing a reinforcing filler, particularly only silica or aluminum hydroxide, than the effect on vulcanized compositions containing carbon black. The reason is thought to be adsorption of metal dithiophosphates to the surface of silica or aluminum hydroxide. In the MB Embodiment of the present invention, the excellent effect of enhancing the resistance to heat aging by metal dithiophosphates can be considered to be obtained because the specific tertiary amine compound used in the composition masks the peripheral portions of silica and suppresses adsorption of metal dithiophosphates to, for example, silica.

EXAMPLES

The present invention is described more specifically with reference to examples in the following. However, the present invention is not limited to the examples.

I. Examples of the MA Embodiment are shown in Examples 1 to 16 and Comparative Examples 1 to 14

Heat resistance of vulcanizates was measured in accordance with the following method in the Examples and Comparative Examples.

A blow-out temperature was used as the index for heat resistance. The blow-out temperature is the temperature at which bubbles first appear inside the rubber in the measurement using a fixed stress blow-out tester described in Rubber World, 214, No.6, 24 (1996) at a starting temperature of 80° C., a fixed stress of 25 kgf, and a frequency of 25 Hz. Therefore, the higher the blow-out temperature, the better the evaluation of heat resistance.

The blow-out temperature cannot be measured when the tensile stress at a fixed elongation varies extremely. Therefore, the measurement was conducted while the tensile stress at 200% elongation (M200) was kept in the range of 4 to 7 MPa. M200 was measured in accordance with the method of Japanese Industrial Standard K6301 (1975).

Examples 1 to 16 and Comparative Example 1 to 14

Rubber compositions were prepared by mixing components in accordance with the basic formulation shown in Table 2 and individual formulations shown in Tables 3 to 6 using an ordinary Banbury mixer. The obtained rubber compositions were vulcanized at 145° C. for a period of time equivalent to 1.5 to 2.0 times the T90 value which was obtained by measurement using an MDR2000 (manufactured by FLEXSIS Co., USA, former MONSANTO Co.) at 145° C. The heat resistance of the obtained vulcanizates was measured. The results are shown in Tables 3 to 6.

TABLE 2

Basic Formulation

| | parts by weight |
|---|---|
| rubber material | 100 |
| carbon black[1] | varied |
| aromatic oil | 25 |
| stearic acid | 2 |
| zinc oxide | 3 |
| antioxidant[2] | 2 |
| metal dithiophosphate | varied |
| vulcanization accelerator | varied |
| sulfur | 1.5 |

1) SEAST 3H (manufactured by TOKAI CARBON Co., Ltd.)
2) NOCRAC 6C (manufactured by OUCHI SHINKO KAGAKU KOGYO Co., Ltd.)

TABLE 3

| Example | 1 | 2 | 3 | 4 | 5 | 6 | 7 | 8 |
|---|---|---|---|---|---|---|---|---|
| Formulation (parts by weight) | | | | | | | | |
| SBR | 100 | 100 | 100 | 100 | 100 | 100 | 100 | 100 |
| NR | — | — | — | — | — | — | — | — |
| BR | — | — | — | — | — | — | — | — |
| carbon black | 50 | 50 | 50 | 50 | 50 | 50 | 50 | 50 |
| vulcanization accelerator X | 2 | 1.5 | 1 | 0.5 | 0.3 | 0.3 | 1 | 1 |
| vulcanization accelerator Y | — | — | — | — | — | — | — | — |
| zinc dithiophosphate | — | — | — | — | — | — | — | — |
| antimony dithiophosphate A | 0.2 | 0.5 | 1 | 1.5 | 2 | 3 | — | — |
| antimony dithiophosphate B | — | — | — | — | — | — | 1.11 | — |
| antimony dithiophosphate C | — | — | — | — | — | — | — | 1.55 |
| Physical properties | | | | | | | | |
| M200 (MPa) | 4.8 | 4.8 | 5.1 | 4.7 | 4.7 | 4.6 | 4.9 | 4.8 |
| heat resistance blow-out temperature (°C.) | 190 | 191 | 192 | 192 | 193 | 193 | 191 | 190 |

SBR: SBR1500 (manufactured by JAPAN SYNTHETIC RUBBER Co., Ltd.)
BR: BR01 (manufactured by JAPAN SYNTHETIC RUBBER Co., Ltd.)
vulcanization accelerator X: N-t-butylbenzothiazylsulfenamide
vulcanization accelerator Y: tetra(2-ethylhexyl)thiuramdisufide
zinc dithiophosphate: zinc O,O-dibutyldithiophosphate
antimony dithiophosphate A: antimony O,O-diisopropyldithiophosphate
antimony dithiophosphate B: antimony O,O-dibutyldithiophosphate
antimony dithiophosphate C: antimony O,O-bis(2-ethylhexyl)dithiophosphate

TABLE 4

| Example | 9 | 10 | 11 | 12 | 13 | 14 | 15 | 16 |
|---|---|---|---|---|---|---|---|---|
| Formulation (parts by weight) | | | | | | | | |
| SBR | 100 | 100 | 100 | 65 | 45 | 100 | 100 | 100 |
| NR | — | — | — | 35 | 35 | — | — | — |

TABLE 4-continued

| Example | 9 | 10 | 11 | 12 | 13 | 14 | 15 | 16 |
|---|---|---|---|---|---|---|---|---|
| BR | — | — | — | — | 20 | — | — | — |
| carbon black | 50 | 50 | 50 | 50 | 50 | 50 | 50 | 50 |
| vulcanization accelerator X | 1 | — | 1 | 2 | 2 | 2 | 2 | 2 |
| vulcanization accelerator Y | 2 | 3 | — | — | — | — | — | — |
| zinc dithiophosphate | — | — | 1 | — | — | — | — | — |
| antimony dithiophosphate A | 1 | 1 | 1 | 1 | 1 | 1 | 1 | 1 |
| antimony dithiophosphate B | — | — | — | — | — | — | — | — |
| antimony dithiophosphate C | — | — | — | — | — | — | — | — |
| Physical properties | | | | | | | | |
| M200 (MPa) | 5 | 4.8 | 4.9 | 5.8 | 5.2 | 4.2 | 5.8 | 6.4 |
| heat resistance blow-out temperature (°C.) | 195 | 193 | 194 | 168 | 172 | 188 | 189 | 188 |

SBR: SBR1500 (manufactured by JAPAN SYNTHETIC RUBBER Co., Ltd.)
BR: BR01 (manufactured by JAPAN SYNTHETIC RUBBER Co., Ltd.)
vulcanization accelerator X: N-t-butylbenzothiazylsulfenamide
vulcanization accelerator Y: tetra(2-ethylhexyl)thiuramdisufide
zinc dithiophosphate: zinc O,O-dibutyldithiophosphate
antimony dithiophosphate A: antimony O,O-diisopropyldithiophosphate
antimony dithiophosphate B: antimony O,O-dibutyldithiophosphate
antimony dithiophosphate C: antimony O,O-bis(2-ethylhexyl)dithiophosphate

TABLE 5

| Comparative Example | 1 | 2 | 3 | 4 | 5 | 6 | 7 | 8 |
|---|---|---|---|---|---|---|---|---|
| Formulation (parts by weight) | | | | | | | | |
| SBR | 100 | 100 | 100 | 100 | 100 | 100 | 100 | 100 |
| NR | — | — | — | — | — | — | — | — |
| BR | — | — | — | — | — | — | — | — |
| carbon black | 50 | 50 | 50 | 50 | 50 | 50 | 50 | 50 |
| vulcanization accelerator X | 1.5 | 2 | 2.5 | 1.5 | 1 | 0.5 | 0.3 | 0.3 |
| vulcanization accelerator Y | — | — | — | 0.5 | 1 | 1.5 | 2 | 3 |
| Physical properties | | | | | | | | |
| M200 (MPa) | 4.3 | 5 | 5.6 | 4.9 | 5.1 | 4.8 | 4.7 | 4.6 |
| heat resistance blow-out temperature (°C.) | 176 | 180 | 182 | 183 | 185 | 185 | 184 | 183 |

SBR: SBR1500 (manufactured by JAPAN SYNTHETIC RUBBER Co., Ltd.)
BR: BR01 (manufactured by JAPAN SYNTHETIC RUBBER Co., Ltd.)
vulcanization accelerator X: N-t-butylbenzothiazylsulfenamide
vulcanization accelerator Y: tetra(2-ethylhexyl)thiuramdisufide

TABLE 6

| Comparative Example | 9 | 10 | 11 | 12 | 13 | 14 |
|---|---|---|---|---|---|---|
| Formulation (parts by weight) | | | | | | |
| SBR | 100 | 65 | 45 | 100 | 100 | 100 |
| NR | — | 35 | 35 | — | — | — |
| BR | — | 0 | 20 | — | — | — |
| carbon black | 50 | 50 | 50 | 35 | 80 | 100 |
| vulcanization accelerator X | 1 | 2 | 2 | 2 | 2 | 2 |
| vulcanization accelerator Y | 2 | — | — | — | — | — |
| Physical properties | | | | | | |
| M200 (MPa) | 5.1 | 5.9 | 5.3 | 4.2 | 6 | 6.6 |
| heat resistance blow-out temperature (°C.) | 184 | 161 | 164 | 179 | 180 | 178 |

SBR: SBR1500 (manufactured by JAPAN SYNTHETIC RUBBER Co., Ltd.)
BR: BR01 (manufactured by JAPAN SYNTHETIC RUBBER Co., Ltd.)
vulcanization accelerator X: N-t-butylbenzothiazylsulfenamide
vulcanization accelerator Y: tetra(2-ethylhexyl)thiuramdisufide The results in Tables 3 to 6 can be summarized as follows. The blow-out temperature is increased by increasing the tensile stress at a fixed elongation which is brought about by increasing the amount of N-t-butylbenzothiazylsulfenamide, i.e., a conventional vulcanization accelerator (Comparative Examples 1 to 3), but the effect is shown only to a limited degree. When tetra(2-ethylhexyl)thiuramdisulfide was used in addition to N-t-butylbenzothiazylsulfenamide (Comparative Examples 4 to 9), the blow-out temperature (heat resistance) was improved by about 5° C. When antimony dithiophosphates were used in addition to N-t-butylbenzothiazylsulfenamide (Examples 1 to 8), the blow-out temperature was increased by a further 5° C. in comparison with the result obtained by using tetra(2-ethylhexyl)thiuramdisulfide. Thus, it is shown that better heat resistance could be exhibited when antimony dithiophosphates were used. Still better heat resistance could be obtained when a combination of antimony dithiophosphate and zinc dithiophosphate (Example 11) or a combination of antimony dithiophosphate and tetra(2-ethylhexyl)thiuramdisulfide (Examples 9 and 10) was used. Antimony dithiophosphates always provided significantly better heat resistance than the conventional vulcanization accelerators when various compositions of the rubber component and various amounts of carbon black were used (Examples 12 to 16 and Comparative Examples 10 to 14).

II. Examples of the MB Embodiment are shown in Examples 17 to 36 and Comparative Examples 15 to 24

The physical properties were measured in accordance with the following methods.

Initial Fracture Property

The measurement was conducted in accordance with the method of Japanese Industrial Standard K 6301 (1975) using samples before heat aging. Hardness (Hd, Japanese Industrial Standard A hardness) was measured at first, and then the tensile test was conducted to obtain tensile strength (Tb), elongation at break (Eb), and tensile stress at 200% elongation (M200).

Fracture Properties After Heat Aging

Heat aging of samples was conducted in a gear oven at 100° C. for 48 hours. The samples were then taken out from the oven, left standing at room temperature for 6 hours, and used for the test to obtain Hd, Tb, Eb, and M200. Changes in the values of Hd, Tb, Eb, and M200 after heat aging for 48 hours from the corresponding original values were also obtained. The closer the change in the value to 100%, the better the evaluation.

Examples 17 to 36 and Comparative Examples 15 to 24

Rubber compositions were prepared by mixing components in accordance with the basic formulation shown in Table 7 and individual formulations shown in Tables 8 to 12 using an ordinary Banbury mixer. The obtained rubber compositions were vulcanized at 145° C. for a period of time equivalent to 1.5 to 2.0 times the T90 value which was obtained by measurement using an MDR2000 (manufactured by FLEXSIS Co., USA, former MONSANTO Co.) at 145° C. Initial fracture property and after heat aging and changes in the values in the properties of the vulcanizates obtained were measured. The results are shown in Tables 8 to 12.

TABLE 7

| Components of formulation | parts by weight |
| --- | --- |
| rubber material | 100 |
| silica | varied |
| carbon black[1] | varied |
| aromatic oil | 20 |
| stearic acid | 2 |
| silane coupling agent[2] | varied |
| tertiary amine compound | varied |
| zinc oxide | 3 |
| antioxidant[3] | 2 |
| vulcanization accelerator[4] | varied |
| zinc dithiophosphate | varied |
| sulfur | 1.5 |

1) SEAST 3H (manufactured by TOKAI CARBON Co., Ltd.)
2) Si69 (a trade name, manufactured by DEGUSSA AG.) bis(3-triethoxysilylpropyl)tetrasulfide
3) N-phenyl-p-phenylenediamine
4) N-t-butylbenzothiazylsulfenamide

TABLE 8

| Example | 17 | 18 | 19 | 20 | 21 | 22 |
| --- | --- | --- | --- | --- | --- | --- |
| Formulation (parts by weight) | | | | | | |
| SBR | 100 | 100 | 100 | 100 | 100 | 100 |
| NR | — | — | — | — | — | — |
| BR | — | — | — | — | — | — |
| carbon black | 40 | 40 | 40 | 40 | 40 | 40 |
| silica | 40 | 40 | 40 | 40 | 40 | 40 |
| aluminum hydroxide[1] | — | — | — | — | — | — |
| silane coupling agent | 4 | 4 | 4 | 4 | 4 | 4 |
| vulcanization accelerator | 2 | 1.5 | 1 | 0.5 | 0.2 | 1 |
| tertiary amine X | 1 | 1 | 1 | 1 | 1 | 1 |
| tertiary amine Y | — | — | — | — | — | — |
| tertiary amine Z | — | — | — | — | — | — |
| zinc dithiophosphate A | 0.2 | 0.5 | 1 | 1.5 | 2 | — |
| zinc dithiophosphate B | — | — | — | — | — | 1.1 |
| zinc dithiophosphate C | — | — | — | — | — | — |
| Physical properties | | | | | | |
| initial | | | | | | |
| Hd (°) | 60 | 60 | 61 | 61 | 62 | 59 |
| Tb (MPa) | 17.9 | 17.6 | 16.3 | 15.8 | 15.6 | 17.2 |
| Eb (%) | 495 | 457 | 394 | 364 | 341 | 381 |
| M200 (MPa) | 5 | 5.5 | 6.4 | 7.1 | 7.8 | 6.2 |
| after aging at 100° C. for 48 hours | | | | | | |
| Hd (°) | 67 | 66 | 66 | 67 | 67 | 64 |
| Tb (MPa) | 15.2 | 15.1 | 15.0 | 13.6 | 13.6 | 15.1 |
| Eb (%) | 361 | 334 | 315 | 273 | 246 | 301 |
| M200 (MPa) | 7.4 | 7.9 | 8.6 | 8.9 | 9.7 | 8.5 |
| change in value (%) | | | | | | |
| Hd | 111 | 110 | 108 | 110 | 108 | 108 |
| Tb | 85 | 86 | 92 | 86 | 87 | 88 |
| Eb | 73 | 73 | 80 | 75 | 72 | 79 |
| M200 | 148 | 144 | 135 | 125 | 124 | 137 |

1) HIGILITE 43M (a trade name, manufactured by SHOWA DENKO Co., Ltd.)

TABLE 9

| Example | 23 | 24 | 25 | 26 | 27 | 28 | 29 |
| --- | --- | --- | --- | --- | --- | --- | --- |
| Formulation (parts by weight) | | | | | | | |
| SBR | 100 | 100 | 100 | 100 | 100 | 100 | 100 |
| NR | — | — | — | — | — | — | — |
| BR | — | — | — | — | — | — | — |
| carbon black | 40 | 40 | 40 | 40 | 40 | 40 | 40 |
| silica | 40 | 40 | 40 | 40 | 40 | 40 | 40 |
| aluminum hydroxide[1] | — | — | — | — | — | — | — |
| silane coupling agent | 4 | 4 | 4 | 4 | 4 | 4 | 4 |
| vulcanization accelerator | 1 | 1 | 1 | 1 | 1 | 1 | 1 |
| tertiary amine X | 1 | 0.2 | 0.5 | 2 | 3 | — | — |
| tertiary amine Y | — | — | — | — | — | 1 | — |
| tertiary amine Z | — | — | — | — | — | — | 1 |
| zinc dithiophosphate A | — | 1 | 1 | 1 | 1 | 1 | 1 |
| zinc dithiophosphate B | — | — | — | — | — | — | — |
| zinc dithiophosphate C | 1.54 | — | — | — | — | — | — |
| Physical properties | | | | | | | |
| initial | | | | | | | |
| Hd (°) | 58 | 60 | 61 | 60 | 60 | 61 | 60 |
| Tb (MPa) | 16.9 | 17 | 16.9 | 17.8 | 17.2 | 17.1 | 17 |
| Eb (%) | 442 | 421 | 430 | 424 | 410 | 402 | 404 |
| M200 (MPa) | 5.3 | 6.1 | 6.2 | 6.4 | 6.3 | 6.4 | 6.1 |
| after aging at 100° C. for 48 hours | | | | | | | |
| Hd (°) | 62 | 65 | 67 | 67 | 66 | 66 | 65 |
| Tb (MPa) | 15.7 | 15.3 | 14.5 | 15.8 | 15.1 | 14.7 | 15.5 |
| Eb (%) | 336 | 337 | 340 | 331 | 324 | 306 | 303 |

TABLE 9-continued

| Example | 23 | 24 | 25 | 26 | 27 | 28 | 29 |
|---|---|---|---|---|---|---|---|
| M200 (MPa) change in value (%) | 7.4 | 8.4 | 8.3 | 8.5 | 8.3 | 8.8 | 8.2 |
| Hd | 107 | 109 | 110 | 111 | 110 | 109 | 109 |
| Tb | 93 | 90 | 86 | 89 | 88 | 86 | 91 |
| Eb | 76 | 80 | 79 | 78 | 79 | 76 | 75 |
| M200 | 140 | 138 | 134 | 133 | 132 | 137 | 135 |

1) HIGILITE 43M (a trade name, manufactured by SHOWA DENKO Co., Ltd.)

TABLE 10

| Example | 30 | 31 | 32 | 33 | 34 | 35 | 36 |
|---|---|---|---|---|---|---|---|
| Formulation (parts by weight) | | | | | | | |
| SBR | 65 | 45 | 100 | 100 | 100 | 100 | 100 |
| NR | 35 | 35 | — | — | — | — | — |
| BR | — | 20 | — | — | — | — | — |
| carbon black | 40 | 40 | — | — | 10 | 60 | 60 |
| silica | 40 | 40 | 40 | 70 | 70 | 20 | — |
| aluminum hydroxide[1] | — | — | — | — | — | — | 15 |
| silane coupling agent | 4 | 4 | 4 | 7 | 7 | 2 | — |
| vulcanization accelerator | 1 | 1 | 1 | 1 | 1 | 1 | 1 |
| tertiary amine X | 1 | 1 | 1 | 2 | 2 | 1 | 1 |
| tertiary amine Y | — | — | — | — | — | — | — |
| tertiary amine Z | — | — | — | — | — | — | — |
| zinc dithiophosphate A | 1 | 1 | 1 | 1 | 1 | 1 | 1 |
| zinc dithiophosphate B | — | — | — | — | — | — | — |
| zinc dithiophosphate C | — | — | — | — | — | — | — |
| Physical properties | | | | | | | |
| initial | | | | | | | |
| Hd (°) | 62 | 62 | 52 | 57 | 57 | 60 | 56 |
| Tb (MPa) | 18.9 | 17.2 | 15.1 | 15.3 | 16.1 | 17.1 | 14.8 |
| Eb (%) | 445 | 430 | 579 | 445 | 445 | 365 | 336 |
| M200 (MPa) | 6.9 | 6.3 | 3.7 | 4.9 | 5.2 | 6.9 | 5.3 |
| after aging at 100° C. for 48 hours | | | | | | | |
| Hd (°) | 67 | 68 | 56 | 61 | 62 | 65 | 61 |
| Tb (MPa) | 16.1 | 14.1 | 12.7 | 13.2 | 13.5 | 15.2 | 12.7 |
| Eb (%) | 316 | 284 | 428 | 343 | 329 | 285 | 262 |
| M200 (MPa) change in value (%) | 8.8 | 8.4 | 5.3 | 6.5 | 7.3 | 9.0 | 7.2 |
| Hd | 108 | 109 | 107 | 107 | 108 | 108 | 109 |
| Tb | 85 | 82 | 84 | 86 | 84 | 89 | 86 |
| Eb | 71 | 66 | 74 | 77 | 74 | 78 | 78 |
| M200 | 127 | 133 | 143 | 133 | 140 | 131 | 135 |

1) HIGILITE 43M (a trade name, manufactured by SHOWA DENKO Co., Ltd.)

TABLE 11

| Comparative Example | 15 | 16 | 17 | 18 | 19 |
|---|---|---|---|---|---|
| Formulation (parts by weight) | | | | | |
| SBR | 100 | 100 | 100 | 65 | 45 |
| NR | — | — | — | 35 | 35 |
| BR | — | — | — | — | 20 |
| carbon black | 40 | 40 | 40 | 40 | 40 |
| silica | 40 | 40 | 40 | 40 | 40 |
| aluminum hydroxide[1] | — | — | — | — | — |
| silane coupling agent | 4 | 4 | 4 | 4 | 4 |
| vulcanization accelerator | 2.2 | 1 | 2.2 | 2.2 | 2.2 |
| tertiary amine X | — | — | 1 | — | — |
| zinc dithiophosphate A | — | 1 | — | — | — |
| Physical properties | | | | | |
| initial | | | | | |
| Hd (°) | 63 | 62 | 63 | 64 | 63 |
| Tb (MPa) | 16.9 | 16 | 16.4 | 19.3 | 17.8 |
| Eb (%) | 339 | 402 | 389 | 451 | 421 |
| M200 (MPa) | 6.7 | 6.5 | 7 | 7.2 | 6.9 |
| after aging at 100° C. for 48 hours | | | | | |
| Hd (°) | 70 | 68 | 69 | 72 | 71 |
| Tb (MPa) | 15.4 | 14.1 | 14.8 | 16.8 | 14.8 |
| Eb (%) | 279 | 269 | 268 | 280 | 248 |
| M200 (MPa) change in value (%) | 10.4 | 9.6 | 10.8 | 10.7 | 10.5 |
| Hd | 111 | 109 | 110 | 113 | 112 |
| Tb | 91 | 88 | 90 | 87 | 83 |
| Eb | 70 | 67 | 69 | 62 | 59 |
| M200 | 155 | 147 | 154 | 148 | 152 |

1) HIGILITE 43M (a trade name, manufactured by SHOWA DENKO Co., Ltd.)

TABLE 12

| Comparative Example | 20 | 21 | 22 | 23 | 24 |
|---|---|---|---|---|---|
| Formulation (parts by weight) | | | | | |
| SBR | 100 | 100 | 100 | 100 | 100 |
| NR | — | — | — | — | — |
| BR | — | — | — | — | — |
| carbon black | — | — | 10 | 60 | 60 |
| silica | 40 | 70 | 70 | 20 | — |
| aluminum hydroxide[1] | — | — | — | — | 15 |
| silane coupling agent | 4 | 7 | 7 | 2 | — |
| vulcanization accelerator | 2.2 | 2.2 | 2.2 | 2.2 | 2.2 |
| tertiary amine X | — | — | — | — | — |
| zinc dithiophosphate A | — | — | — | — | — |
| Physical properties | | | | | |
| initial | | | | | |
| Hd (°) | 53 | 58 | 58 | 61 | 57 |
| Tb (MPa) | 15 | 16.1 | 16 | 17.1 | 14.7 |
| Eb (%) | 580 | 470 | 440 | 365 | 336 |
| M200 (MPa) | 3.6 | 5.1 | 5.6 | 6.9 | 5.3 |
| after aging at 100° C. for 48 hours | | | | | |
| Hd (°) | 58 | 64 | 64 | 68 | 63 |
| Tb (MPa) | 12.8 | 14.2 | 14.2 | 15.2 | 12.5 |
| Eb (%) | 394 | 329 | 304 | 259 | 212 |
| M200 (MPa) change in value (%) | 5.8 | 7.8 | 8.5 | 10.6 | 8.3 |
| Hd | 109 | 110 | 111 | 112 | 110 |
| Tb | 85 | 88 | 89 | 89 | 85 |
| Eb | 68 | 70 | 69 | 71 | 63 |
| M200 | 161 | 153 | 152 | 153 | 157 |

1) HIGILITE 43M (a trade name, manufactured by SHOWA DENKO Co., Ltd.)

Rubber components and compounding ingredients in Tables 8 to 12 are as follows.

1) SBR: SBR1500 (manufactured by JAPAN SYNTHETIC RUBBER Co., Ltd.)

2) BR: BR01 (manufactured by JAPAN SYNTHETIC RUBBER Co., Ltd.)

3) Silica: NIPSIL AQ (manufactured by NIPPON SILICA KOGYO Co., Ltd.)

4) Tertiary amine X: dimethylstearylamine

5) Tertiary amine Y: dimethyldecylamine

6) Tertiary amine Z: trioctylamine

7) Zinc dithiophosphate A: zinc O,O-diisopropyldithiophosphate

8) Zinc dithiophosphate B: zinc O,O-dibutyldithiophosphate

9) Zinc dithiophosphate C: zinc O,O-bis(2-ethylhexyl) dithiophosphate

The results in Tables 8 to 12 can be summarized as follows.

When a zinc dithiophosphate (Comparative Example 16) or dimethylstearylamine (Comparative Example 17) was used singly, the increase in M200 remained about the same and elongation at break was not improved in comparison with the result in Comparative Example 15 (the control). In contrast, when a zinc dithiophosphate and dimethylstearylamine were used in combination (Example 19), it is apparent that the increase in M200 after heat aging was improved by not less than 15% and elongation at break after heat aging was improved by 10%. The effect of the zinc dithiophosphate was exhibited by its use in an amount of 0.2 parts by weight when the zinc dithiophosphate was used in combination with the amine, and the effect was approximately saturated when the amount was increased to about 2 parts by weight (Examples 17 to 21). Similar effects were found when zinc O,O-diisopropyldithiophosphate, zinc O,O-dibutyldithiophosphate, or O,O-bis(2-ethylhexyl) dithiophosphate was used (Examples 19, 22, and 23). The effect of improving the resistance to heat aging by the combined use of a zinc dithiophosphate and a tertiary amine was also confirmed when the rubber component was changed from SBR to a blend of SBR and NR, and to a blend of SBR, NR, and BR (Comparative Examples 18 and 19 and Examples 30 and 31), when the amount of silica was changed (Examples 32 to 33), and when aluminum hydroxide was used in the formulation (Example 36). The same effect from the combined use of a metal dithiophosphate and a tertiary amine was also confirmed when the amount of the tertiary amine was changed within the range claimed by the present invention (Examples 23 to 27), when the type of the tertiary amine was changed (Examples 28 and 29), when the ratio of blended polymers was changed (Example 30 and Comparative Example 18; Example 31 and Comparative Example 19), when the amount of silica or carbon was changed (Examples 32 to 35 and Comparative Examples 20 to 23), and when aluminum hydroxide was used in place of silica (Example 36 and Comparative Example 24).

What is claimed is:

1. A rubber composition comprising:

100 parts by weight of a rubber component which comprises at least one type of rubber selected from the group consisting of natural rubber and diene synthetic rubbers;

per 100 parts by weight of the rubber component, 0.1 to 10 parts by weight of at least one type of metal dithiophosphate represented by following general formula (I):

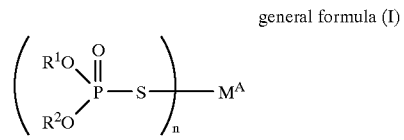

general formula (I)

wherein $R^1$ and $R^2$ each independently represents an alkyl group, an alkenyl group, or a cycloalkyl group each having 19 or fewer carbon atoms, $M^A$ represents an antimony atom, and n represents a valency of $M^A$; and a tertiary amine compound represented by following general formula (IV):

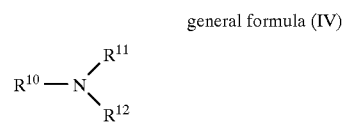

general formula (IV)

wherein $R^{10}$, $R^{11}$, and $R^{12}$ each independently represents a methyl group, an alkyl group having 8 to 36 carbon atoms, an alkenyl group having 8 to 36 carbon atoms, a cyclohexyl group, or a benzyl group.

2. A rubber composition according to claim 1, wherein $R^1$ and $R^2$ in general formula (I) representing the metal dithiophosphate in claim 1 each independently represents an alkyl group or a cycloalkyl group each having 8 or fewer carbon atoms.

3. A rubber composition according to claim 2, comprising the metal dithiophosphate described in claim 2 and at least one compound selected from the group consisting of benzothiazole derivatives represented by following general formula (II) and thiuram compounds represented by following general formula (III):

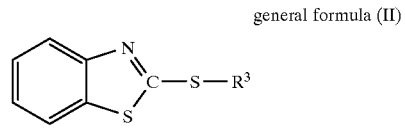

general formula (II)

wherein $R^3$ represents a hydrogen atom, a thiobenzothiazyl group represented by following formula 1:

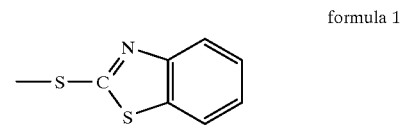

formula 1 or an amino group represented by following formula 2:

formula 2 wherein $R^4$ and $R^5$ each independently represents a hydrogen atom, an alkyl group having 2 to 4 carbon atoms, or a cyclohexyl group, excluding the case in which $R^4$ and $R^5$ both represent hydrogen atoms,

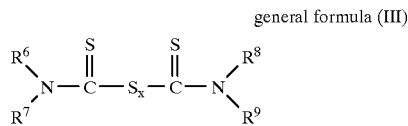

general formula (III)

wherein $R^6$, $R^7$, $R^8$, and $R^9$ each independently represents an alkyl group having 1 to 8 carbon atoms, a cyclohexyl group, a phenyl group, or a benzyl group, or a combination of $R^6$ and $R^7$ and a combination of $R^8$ and $R^9$ each represents a cyclic pentamethylene group or a cyclic methylpentamethylene group in which $R^6$ and $R^7$, and $R^8$ and $R^9$, respectively, are bonded to each other.

4. A rubber composition according to claim 3, wherein $R^6$ $R^7$, $R^8$, and $R^9$ in general formula (III) representing the thiuram compound in claim 3 each independently represents a 2-ethylhexyl group or a benzyl group.

5. A rubber composition according to claim 1, further comprising at least one type of vulcanization accelerator selected from the group consisting of 2-benzothiazyl- sulfenamides and 2-benzothiazylsulfenimides.

6. A rubber composition according to claim 1, wherein the 100 parts by weight of the rubber component comprises 50 parts by weight or more of a styrene-butadiene copolymer.

7. A rubber composition according to claim 1, comprising 15 to 85 parts by weight of a reinforcing inorganic filler selected from silica and aluminum hydroxide per 100 parts by weight of the rubber component.

8. A rubber composition according to claim 7, wherein the reinforcing inorganic filler is silica.

9. A rubber composition according to claim 7, comprising, in an amount of 1 to 15% by weight of the amount of the reinforcing inorganic filler, a tertiary amine compound represented by following general formula (IV):

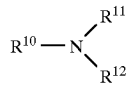

general formula (IV)

wherein $R^{10}$, $R^{11}$, and $R^{12}$ each independently represents a methyl group, an alkyl group having 8 to 36 carbon atoms, an alkenyl group having 8 to 36 carbon atoms, a cyclohexyl group, or a benzyl group.

10. A rubber composition according to claim 8, comprising a silane coupling agent in an amount of 1 to 15% by weight of the amount of silica.

11. A rubber composition according to claim 7, comprising 20 to 150 parts by weight of carbon black as a reinforcing filler per 100 parts by weight of the rubber component.

12. A rubber composition according to claim 1, wherein the 100 parts by weight of the rubber component comprises 50 parts by weight or more of styrene-butadiene copolymer, and the rubber composition comprises 15 to 85 parts by weight of silica as a reinforcing inorganic filler per 100 parts by weight of the rubber component, at least one type of vulcanization accelerator selected from the group consisting of 2-benzothiazylsulfenamides and 2-benzothiazylsulfenimides, and a tertiary amine compound in an amount of 1 to 15% by weight of the amount of the reinforcing inorganic filler.

13. A rubber composition comprising:
100 parts by weight of a rubber component which comprises at least one rubber selected from the group consisting of natural rubber and diene synthetic rubbers;

per 100 parts by weight of the rubber component, 15 to 85 parts by weight of a reinforcing inorganic filler;
per 100 parts by weight of the rubber component, 0.1 to 5 parts by weight of at least one type of metal dithiophosphate represented by following general formula (V):

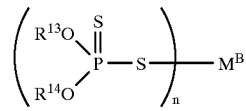

general formula (V)

wherein $R^{13}$ and $R^{14}$ each independently represents an alkyl group or a cycloalkyl group, $M^B$ represents a zinc atom, a copper atom, or an iron atom, and n represents a valency of $M^B$, and, in an amount of 0.5 to 15% by weight of the amount of the reinforcing inorganic filler, at least one type of tertiary amine compound represented by following general formula (VI):

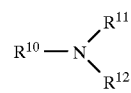

general formula (VI)

wherein $R^{10}$, $R^{11}$, and $R^{12}$ each independently represents a methyl group, an alkyl group having 8 to 36 carbon atoms, an alkenyl group having 8 to 36 carbon atoms, a cyclohexyl group, or a benzyl group.

14. A rubber composition according to claim 13, wherein $R^{13}$ and $R^{14}$ in general formula (V) representing the metal dithiophosphate in claim 13 each independently represents an alkyl group having 2 to 8 carbon atoms, and $M^B$ represents a zinc atom.

15. A rubber composition according to claim 13, wherein $R^{13}$ and $R^{14}$ in general formula (V) representing the metal dithiophosphate in claim 13 each independently represents an alkyl group having 3 or 4 carbon atoms.

16. A rubber composition according to claim 13, wherein the metal dithiophosphate represented by general formula (V) in claim 13 is zinc dithiophosphate, and the rubber composition comprises at least one type of vulcanization accelerator selected from the group consisting of 2-benzothiazylsulfenamides and 2-benzothiazylsulfenimides.

17. A rubber composition according to claim 13, wherein the reinforcing inorganic filler is silica or aluminum hydroxide.

18. A rubber composition according to claim 13, wherein the reinforcing inorganic filler is silica.

19. A rubber composition according to claim 18, comprising a silane coupling agent in an amount of 1 to 15% by weight of the amount of silica.

20. A rubber composition according to claim 13, comprising 5 to 80 parts by weight of carbon black per 100 parts by weight of the rubber component.

21. A rubber composition according to claim 13, wherein the tertiary amine compound represented by general formula (VI) in claim 13 has a molecular weight of 180 or more.

22. A rubber composition according to claim 13, wherein, in general formula (VI) representing the tertiary amine compound in claim 13, $R^{10}$ and $R^{11}$ both represent methyl groups, and $R^{12}$ represents an alkyl group having 12 to 36 carbon atoms.

23. A rubber composition according to claim 13, wherein the tertiary amine compound is dimethylstearylamine.

24. A rubber composition according to claim 13, wherein $R^{13}$ and $R^{14}$ in general formula (V) representing the metal dithiophosphate in claim 13 each independently represents an alkyl group having 3 or 4 carbon atoms, the tertiary amine compound is dimethylstearylamine, a silane coupling agent is comprised in an amount of 1 to 15% by weight of the amount of silica, and carbon black is comprised in an amount of 5 to 80 parts by weight per 100 parts by weight of the rubber component.

* * * * *

UNITED STATES PATENT AND TRADEMARK OFFICE
CERTIFICATE OF CORRECTION

PATENT NO. : 5,939,493
DATED : August 17, 1999
INVENTOR(S) : Masahiro HOJO

It is certified that error appears in the above-identified patent and that said Letters Patent is hereby corrected as shown below:

On the title page, item [54] and Col. 1. line 1,

In the Title: "PNEUMATIC TIRE" should be --RUBBER COMPOSITION--.

Signed and Sealed this

Twenty-ninth Day of February, 2000

*Attest:*

Q. TODD DICKINSON

*Attesting Officer*     *Commissioner of Patents and Trademarks*

UNITED STATES PATENT AND TRADEMARK OFFICE
CERTIFICATE OF CORRECTION

PATENT : 5,939,493

DATED : August 17, 1999

INVENTOR(S) : Masahiro Hojo

It is certified that error appears in the above-identified patent and that said Letters Patent is hereby corrected as shown below:

Column 20, line 5-9, in the
General formula (I), delete

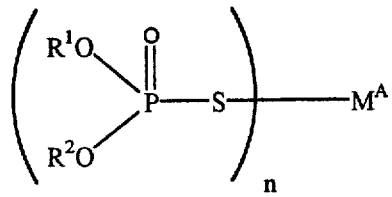

and replace with

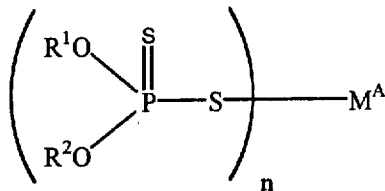

Signed and Sealed this

Twelfth Day of September, 2000

Attest:

Q. TODD DICKINSON

Attesting Officer

Director of Patents and Trademarks